United States Patent [19]

Müller

[11] 4,246,937
[45] Jan. 27, 1981

[54] CABLE STRUCTURE WITH CABLE SHEATH

[75] Inventor: Hans R. Müller, Herrliberg, Switzerland

[73] Assignee: Bureau BBR Ltd., Zurich, Switzerland

[21] Appl. No.: 971,494

[22] Filed: Dec. 20, 1978

[30] Foreign Application Priority Data

Dec. 21, 1977 [CH] Switzerland .................. 15826/77

[51] Int. Cl.³ .................. E04H 12/20; H01B 11/18; F16G 11/00
[52] U.S. Cl. .................. 138/108; 52/147; 52/148; 57/210; 138/112; 174/28; 308/4 R
[58] Field of Search .................. 52/147, 148; 174/28; 138/108, 112, 113, 114; 308/4 R; 254/190 R, 135 R; 166/241; 57/210

[56] References Cited

U.S. PATENT DOCUMENTS

| 3,789,129 | 1/1974 | Ditscheid | 138/113 |
| 3,792,188 | 2/1974 | Cronin | 174/28 |
| 3,999,340 | 12/1976 | Bogese et al. | 138/108 |
| 4,156,299 | 5/1979 | Kovac | 138/113 |

FOREIGN PATENT DOCUMENTS 856241  3/1940  France .................. 174/28

Primary Examiner—Steven L. Stephan

[57] ABSTRACT

A cable structure comprising a cable provided with a cable sheath in the form of a flexible corrugated or undulated tube. Between the cable and the sheath there are arranged guide bodies at predetermined locations. The guide bodies are fixed at the inside of the sheath and are provided with domed or arched guide surfaces at the side of the cable, in order to guide the cable both in a straight and bent condition.

1 Claim, 2 Drawing Figures

CABLE STRUCTURE WITH CABLE SHEATH

BACKGROUND OF THE INVENTION

The present invention relates to a new and improved cable structure comprising a cable provided with a cable sheath or jacket in the form of a flexible corrugated or undulated tube.

Such type cable structures are particularly used in above-ground or building structures and underground structures as tensioning cables. The cable itself is formed of a wire, or however stranded wires, and a number of wires or stranded wires are assembled together into a cable.

Cable sheaths in the form of flexible corrugated or undulated tubes are already known to the art. Such sheaths or jackets conventionally consist of an undulated tube formed of metal which can be surrounded by a corrosion protective layer, for instance bitumen. The entire structure can be surrounded by a thin outer jacket formed of plastic.

Such cable sheaths normally form a corrosion protection for the actual cable. The cable does not directly bear at the sheath inner wall. In the intermediate space between the sheath and the cable there can be incorporated for instance additional protective material, such as for example a protective grease mass.

Cables provided with such type sheaths are presently, whenever possible, already wound-up at the factory upon large drums and transported to the construction site. Also during such transport care must be taken to ensure that the sheaths are not damaged, since otherwise their actual effect is impaired.

Also during operation cables equipped with such sheaths are subjected to the most different loads. The actual tensile load does not have any negative effect upon the sheath or jacket. If, however, during operation such cable begins to oscillate, something possible for instance in the case of anchoring cables for floating platforms and the like, then there are required special protective measures for the cable surrounded by the corrugated tubes.

SUMMARY OF THE INVENTION

It is a primary object of the present invention to provide a new and improved cable with a cable sheath which is not associated with the aforementioned drawbacks and limitations of the prior art proposals.

Another more specific object of the present invention aims at providing a new and improved construction of cable with cable sheath of the previously mentioned type, wherein cable deflections arising during transport or during operation do not have any damaging effects.

The inventive cable structure which comprises a cable equipped with a cable sheath in the form of a flexible corrugated or undulated tube is manifested by the features that guide bodies are arranged at predetermined locations between the cable and the sheath. These guide bodies are fixed at the inside of the sheath and possess arched or domed guide surfaces at the side of the cable, in order to guide the cable in its straight and bent condition.

The guide bodies are advantageously constructed in the form of substantially ring-shaped sleeves. The inner surface of each sleeve forms the guide surface for the cable and initially constricts or tapers in a trumpet-like fashion from one side thereof and then again widens in a trumpet-like fashion. The outer surface of each guide body is advantageously structured in a thread-like fashion so that the guide body can be threaded at the mating thread-like windings provided at the inner surface or inside of the cable sheath.

The guide bodies can be formed of plastic or metal.

It is advantageous to arrange a reinforcement ring directly over each of the related guide bodies at the outside of the cable sheath, in order to reinforce the possible deflection locations. Also such reinforcement ring possesses a thread-like inner surface, so that it can be threaded onto the wavy-shaped or corrugated sheath.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
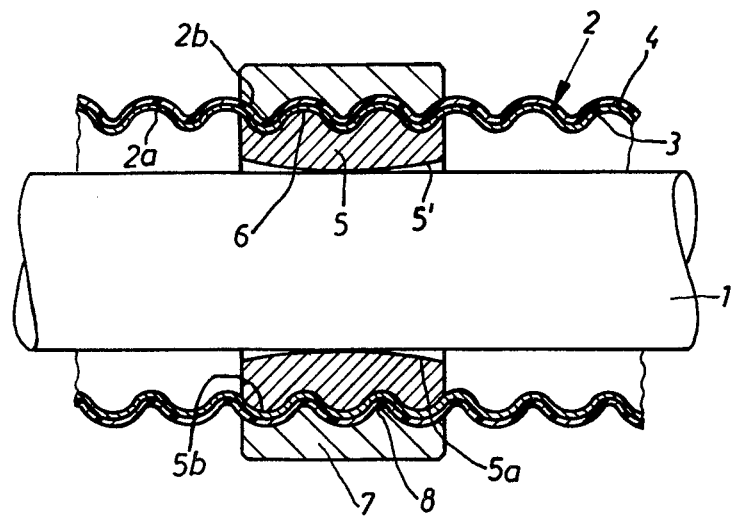
FIG. 1 is a purely schematic sectional view through a cable enclosed by a corrugated tube at a location provided with a guide body.

Describing now the drawings, in FIG. 1 there is shown an exemplary embodiment of inventive cable structure embodying a cable 1 surrounded by a corrugated or undulated tube 2. The cable 1 can consist of wires or stranded wires. With the illustrated embodiment the corrugated tube 2 comprises an inwardly situated metallic tube 3 and a protective layer 4 mounted at the outer surface or outside of the metallic tube 3. The protective layer 4 can be formed of bitumen for instance. The entire structure can be additionally encased by means of a plastic protective layer.

Between the cable 1 and the corrugated tube 2 there are arranged axially of such cable 1 at predetermined locations guide bodies 5, for instance in the form of substantially ring-shaped sleeves, there having been shown in FIG. 1 one such guide body 5 at the illustrated location. Each such guide body 5, which of course also performs the function of a spacer body, will be seen to have an inner passage 5a for the cable 1. This passage or passageway 5a has a guide surface 5' which is arched or domed in the direction of the cable 1. More specifically, it will be seen that the guide surface 5' tapers or constricts in a substantially trumpet-like fashion initially in the direction of through passage of the cable 1, from one end of the passageway 5a towards the center thereof, then at the center again outwardly widens in a trumpet-like fashion towards the other end of such passageway 5a. Consequently, even when the cable 1 bends it always can bear against the inner guide surface 5' of the guide body 5. This guide body 5 is secured to the inside or inner surface 2a of the corrugated tube 2 in that thread-like protuberances or raised portions 6 are provided at the outside or outer surface 5b of the guide body 5, so that the entire guide body 5 can be threaded into the corrugated tube 2 at the contemplated location. As mentioned, the guide body 5 can be formed of plastic or metal.

A reinforcement body 7 in the form of a reinforcement ring is provided at the outside or outer surface 2b of the corrugated tube 2, defining the cable sheath, directly over the guide body 5. Also this reinforcement body 7 is threaded on to the cable sheath or jacket 2, specifically inasmuch as a threaded connection is provided by means of likewise thread-like raised portions 5 or protuberances 8. Due to the arrangement of such reinforcement body or ring 7 the support location is protected against all possible effects.

Figure 2:
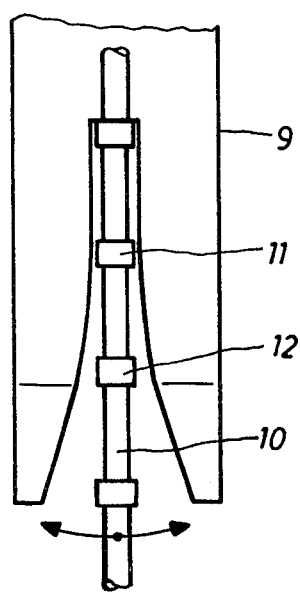
FIG. 2 is a schematic illustration showing how in practice a tensioning or anchoring cable can move owing to the presence of oscillations.

FIG. 2 of the drawing shows purely schematically a possible application of the invention. Reference character 9 illustrates by way of example the leg of a floating platform. This platform is anchored by means of an anchoring cable to the bottom of the ocean or other body of water. One such cable equipped with a cable sheath, constructed in the manner as described above according to the teachings of the invention, has been designated by reference character 10. At the locations 11 and 12 there are mounted at the cable sheath reinforcement elements. As explained previously in conjunction with FIG. 1 below these reinforcement elements there are located the guide bodies in accordance with the previously disclosed teachings of the invention. Now if the cable is exposed to oscillations, owing to movement of the platform and thus also the leg of the platform, then the cable will bend or deflect. By virtue of the inventive measures the entire anchoring is not exposed to any damage.

While there are shown and described present preferred embodiments of the invention, it is to be distinctly understood that the invention is not limited thereto, but may be otherwise variously embodied and practiced within the scope of the following claims.
ACCORDINGLY,

What is claimed is:

1. A cable structure comprising:

a cable;

a cable sheath in the form of a flexible corrugated tube surrounding said cable and having an inner surface provided with thread-like windings;

at least one guide body arranged at a predetermined location between the cable and the cable sheath, said guide body having an outer surface provided with thread-like portions engaging with said thread-like windings in order to fix the guide body at the inside of the cable sheath, and said guide body being structured as a substantially ring-shaped sleeve, said sleeve having an inner wall defining guide surface means for the cable which are domed in the direction of the cable in order to guide the cable both in its straight and bent condition, said inner wall tapering from one end of the sleeve towards the center thereof and then again widening from the center of said sleeve towards the other end thereof; and a reinforcement ring mounted at the outside of the cable sheath directly over the guide body, said reinforcement ring including means for threading said reinforcement ring onto the outside of the cable sheath.

* * * * *